Figure 1:
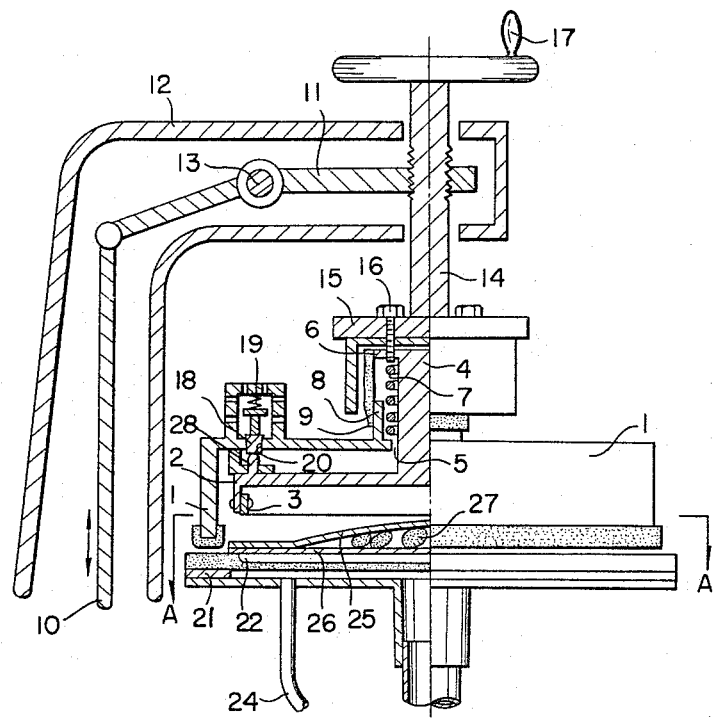

Aug. 23, 1966 SHOZO OMORI 3,267,634
METHOD AND APPARATUS FOR PRODUCING VACUUM PACKAGES FOR FOOD
Filed July 15, 1963

SHOZO OMORI
INVENTOR.

BY Wenderoth, Lind
and Ponack
attorneys

United States Patent Office 3,267,634
Patented August 23, 1966

3,267,634
METHOD AND APPARATUS FOR PRODUCING
VACUUM PACKAGES FOR FOOD
Shozo Omori, 7–4 Negishi 5-chome,
Daito-ku, Tokyo, Japan
Filed July 15, 1963, Ser. No. 294,979
Claims priority, application Japan, Aug. 2, 1962,
37/32,252
11 Claims. (Cl. 53—22)

The present invention is, in general, related to a method and apparatus for producing vacuum packages, and more particularly to an improved method and apparatus for producing vacuum packages for food.

In the prior art, the methods for the production of vacuum packages require the employment of a complex apparatus. In one method two sheets of film disposed in a parallel and spaced relationship, with the material to be packaged therebetween, are sealed together on three sides to form one square package unit, the remaining side being left unsealed, and then cut around the seal, the package thus formed thereafter being fed into a separate vacuum device where the air entrapped therein is evacuated, the unsealed side of the package then being sealed. In another prior art type of apparatus, all four sides of the film wrapper are sealed at the same time, the entrapped air being evacuated therefrom. In both of the prior art types referred to above the packaging apparatus requires separate sealing and vacuum devices which inevitably complicates the operation and accordingly, such apparatus is large.

It is therefore an object of the present invention to provide a method and a relatively simple, compact and efficient apparatus for producing vacuum packages for food whereby materials are vacuum packed in a package of film in a single step, thereby eliminating the above disadvantages inherent in the vacuum package producing apparatus of the prior art.

In one way of working the present invention, a series of vacuum packages are formed from two strips of polyethylene film in parallel and spaced relationship having materials to be packaged interposed at spaced intervals longitudinally therebetween, by intermittently moving said package elements to a predetermined sealing area within the apparatus, stopping the feeding thereof by means of a frame, pressing said films together, evacuating the space enclosed by the frame and sealing the films together around the contents by means of another frame while maintaining the first frame under vacuum.

According to another way of working the present invention there is provided an apparatus for carrying out the above method which apparatus comprises an inner frame and an outer frame the sides at right angles to the axis of the apparatus being larger than the width of the film from which the vacuum packages are to be formed, a work table assembly adapted to move vertically in order that its movement may be synchronized with that of said inner and outer frames, the movement of the outer frame being controlled by the movement of the inner frame through a spring, the inner frame being provided with a sealing electrode and being movable to bring the sealing electrode into contact with the two films to seal them together around the contents, and means being provided to produce a vacuum in the outer frame when it is in contact with the work table assembly.

In order to facilitate understanding of the present invention, reference will now be made to the appended drawings of a preferred specific embodiment of the present invention. Such drawings should not be construed as limiting the invention which is properly set forth in the appended claims.

Figure 2:
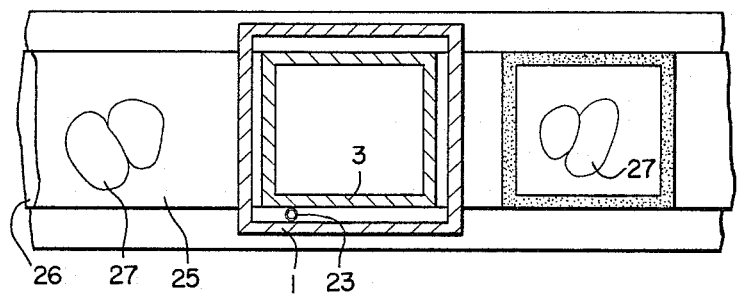

In the drawings:

FIG. 1 is a front end elevational view partially in section of a specific embodiment of the present invention, and FIG. 2 is a sectional plan view taken along the line A—A of FIG. 1.

Referring to the drawings, the vacuum package producing apparatus of the present invention comprises, in general, an outer box-shaped frame 1, its width at right angles to the axis of the apparatus being wider than the width of films 25 and 26 from which packages are to be produced, an inner box-shaped frame 2 which has dimensions corresponding to one unit of package and being provided with a sealing electrode 3 secured to the inner wall of inner frame 2, and a vertically movable work table assembly 21, outer frame 1 being provided on its upper surface with an upwardly directed and centrally positioned tubular extension 8, and with a centrally positioned opening 5. The inner frame 2 is provided with a centrally positioned shaft 4 extending upwardly from the frame 2 and passing through the tubular extension 8 and the center opening 5 of the outer frame 1. The shaft 4 is provided with a flange 6 at the upper end thereof, and a spring 7 is disposed between the flange 6 and the upper peripheral edge of the opening 5 in the outer frame 1. A tubular sealing member 9 made of rubber is disposed around the extension 8 on the outer frame 1 extending upwardly to the peripheral edge of the flange 6 on the shaft 4 to provide a seal between the extension 8 and flange 6, and, accordingly, between the outer and inner frames. The apparatus further comprises an operating shaft 14 which has a flange 15 at the bottom end thereof which is adapted to be fixedly secured to flange 6 on shaft 4 by means of bolts 16. Shaft 14 caused to move reciprocally in a vertical direction by a cam (not shown) through a linkage which comprises a lever 10 and an integral lateral lever 11 connected to each other and pivoted at shaft 13 extending across the casing 12, the lever 11 having a forked end pivoted to a pin (not shown) extending laterally through shaft 14. A hand wheel 17 is provided at the upper end of the shaft 14 for adjusting the position of the linkage, and, accordingly, the vertical position of shaft 14, the adjustment of the hand wheel 17 controlling the vertical position of the shaft 14, and in turn the vertical position of frames 1 and 2 whenever necessity for such adjustment arises. The outer frame 1 is further provided with a valve 18 on its upper surface for taking air therein and the valve is pressed downwardly by means of a compression spring 19 so as to seal the valve receiving opening 20 formed in the upper surface of the outer frame 1. The work table assembly 21 comprises two plate members disposed one upon another and is adapted to vertically move in a synchronized time relation with the frames. The upper sealing plate has a recess 22 on the surface thereof the width of which is wider than the width of the films 25 and 26, and has also a plurality of evacuation holes (not shown). The lower plate member is provided with a single evacuation hole 23 which communicates with said evacuation holes of the upper plate and communicates through a pipe 24 with a vacuum pump. The work table assembly is positioned beneath the outer frame 1 so as to hold the fed films between the same and the outer frame 1. The above-mentioned electrode 3 is at all times maintained energized by means of nichrome wires connected thereto and said nichrome wires have terminals which have a connection with a suitable electric source.

The operation of the above-mentioned apparatus of the present invention will now be explained.

With the various parts of the apparatus set up as shown in FIG. 1, materials to be packaged (27) are placed, properly spaced, between films 25 and 26, as they are reeled out of separate feed rolls and fed across the work table assembly (to the right in FIG. 2). When the length of film required for producing one unit of sealed package are properly positioned beneath outer frame 1, the feeding of the films is stopped. The actuating cam which is operatively connected to the linkage and the work table is then actuated to move upwardly and, hence, to move lever 11 clockwise about shaft 13 thereby causing shaft 14 to move downwardly. The downward movement of shaft 14 moves both the outer frame 1 and inner frame 2 downwardly, outer frame 1 first abutting against the work table assembly, and further downward movement of inner frame 2 causes it to abut against the work table while outer frame 1 is maintained in abutting relationship against the work table assembly by virtue of the compression of spring 7. The air within the outer frame 1, and accordingly, the air within the films 25 and 26 is evacuated through the evacuation holes 23 of the work table assembly by way of the pipe 24 after abutting of outer frame 1 against work table assembly but before inner frame abuts against the work table assembly with the films sandwiched between the inner frame and the work table assembly thereby to establish vacuum within the space enclosed by films 25 and 26. Several seconds after the evacuation, the electrode 3 of inner frame 2 presses and seals the films all around to vacuum pack the contents. As soon as the sealing of the films has been completed, the actuating cam is again acuated to cause the lever 10 to move downwardly whereby inner frame 2 is first pulled upwardly and the upwardly projecting spigot 28 of inner frame 2 pushes open valve 18 on the outer frame 1 to permit air to enter into outer frame 1, outer frame 1 then being released from its contact with films 25 and 26 and pulled up to its original position ready for the next cycle of operation.

The apparatus then assumes its position as shown in FIG. 1 in which the feeding of the two strips of film is resumed and the film being allowed to continue to advance along the work table until the predetermined length of film required for the next package takes its position just beneath frame 1 and the sealing operation is repeated in the manner as described above.

As seen from the foregoing, according to the present invention, the apparatus is comprised of outer and inner box-shaped frames operatively connected to each other, and by the pressure of the frames in succession against the films, the outer frame first contacts and presses the films at the front and rear of the sealing area and evacuates the air between the films at one side thereof where the evacuation holes of the work table communicate thereby establishing a vacuum therein, and thereafter, the inner frame is caused to move downwardly to seal all around the package contents in the thus formed vacuum, and therefore, the operation of the apparatus is quite simple and the same can be formed in a compact construction. It takes only several seconds to complete both the vacuum producing and sealing operations, which is far superior to the operation of the prior art apparatus.

It will be understood that the foregoing description and example is only illustrative of the present invention and it is not intended that the invention be limited thereto. All substitutions, alterations and modifications of the present invention which come within the scope of the following claims or to which the present invention is readily susceptible without departing from the spirit and scope of this disclosure are considered parts of the present invention.

What is claimed is:

1. A method of producing vacuum packages in succession from two sheets of films successively fed from supply rolls having material to be packaged interposed therebetween comprising: first moving a first frame against a work table in a direction transversely of the plane of the work table and pressing it against said table so as to sandwich the films lengthwise with the portions of the films containing the material therebetween being enclosed within said first frame and said work table, said first frame being yieldably connected to a second frame with a spring means being interposed therebetween and said first frame being indirectly driven through said spring means by movement of said second frame; evacuating the space enclosed by said first frame and said work table; moving said second frame transversely of the plane of the table and pressing it against said work table with said portions of films being sandwiched at their respective peripheral edges between said second frame and said work table while said first frame is maintained in said pressing relationship against said work table by yielding action of said spring means thereby keeping said space enclosed by said first frame and said work table in an evacuated state; sealing the films along said peripheral edges while the material to be packaged is contained therebetween by means of sealing means attached to said second frame while said second frame is pressed against said work table with the films sandwiched therebetween; releasing said second frame from said work table by drawing it away from the table transversely of the plane of the table while leaving said first frame maintained in pressing relationship against said work table by virtue of the yielding action of said spring means; admitting air into the space enclosed by said first frame and said work table; releasing said first frame from said work table by further movement of said second frame after the yielding action of said spring means is terminated; and ejecting the sealed package from the position between said first frame and said work table by feeding the films.

2. A method of producing vacuum packages as claimed in claim 1 wherein the two sheets of films are fed from feed rolls in a parallel and spaced relationship to each other and the material to be packaged is interposed therebetween as said films are unrolled from their respective feed rolls.

3. A method of producing a vacuum package as set forth in claim 1 in which said pressing of the films by the first frame and evacuation of the first frame are simultaneously carried out.

4. A method of producing a vacuum package as set forth in claim 1 in which said sealing of the films is carried out at a time interval on the order of several seconds after said pressing and evacuating operations have been completed, said three operations being performed while maintaining the first frame under vacuum.

5. An apparatus for producing vacuum packages in succession comprising: an inner frame having a sealing electrode secured to the peripheral edges thereof and a centrally positioned shaft extending upwardly therefrom and having a flange at the upper end thereof; an outer frame having a centrally positioned opening in which said shaft on the inner frame is movably mounted and a centrally positioned tubular extension around said center opening and projecting upwardly from the upper surface of the outer frame; a spring disposed between said flange of said shaft of the inner frame and the upper surface of said outer frame within said tubular extension for allowing yieldable movement of the outer frame relative to the inner frame; a resilient seal sealingly connecting said flange and said tubular extension; a cam-operated reciprocally movable operating shaft secured to said flange of the center shaft of said inner frame; a vertically movable work table assembly adapted to move vertically in synchronization with the movement of said outer frame and having an upper recess therein for receiving films of sealable material containing material to be packaged and an evacuation pipe adapted to be connected to a vacuum device; means for intermittently feeding films in spaced relationship between said work table and said outer frame; means for depositing materials to be packaged between the films while they are in spaced relationship and successively fed; valve means attached to said outer frame biased toward the closed position and engageable by said inner frame when said spring holds said flange and outer frame spaced apart so said inner frame abuts said outer frame, whereby said outer frame is first pressed and held against said work table assembly with the films containing material to be packaged therebetween sandwiched lengthwise between the outer frame and the work table during movement of said cam-operated shaft past the position thereof at which initial engagement of said outer frame occurs by virtue of the yielding of said spring, the space enclosed by said outer frame and said work table assembly being evacuated by said vacuum device through said evacuating pipe while said outer frame is maintained in pressing relationship against said work table and further movement of said cam-operated shaft causing the pressing of said inner frame against said work table assembly with the portions of the films containing material therebetween being sandwiched between the inner frame and the work table assembly at their respective peripheral edges while said spring yields to maintain said outer frame in pressing relationship against said work table assembly so that said peripheral edges are sealed by means of said sealing electrode while the space enclosed by said outer frame and said work table assembly is maintained in vacuum state; said inner frame being released from said work table by return movement of said cam-operated shaft while said outer frame is maintained in pressing relationship against said work table by virtue of the yielding action of said spring; said valve means being released to admit air into the space within said outer frame by being engaged and opened by said inner frame for facilitating the releasing action of said outer frame from said work table assembly; said outer frame being thereafter released from said work table by further return movement of said cam-operated shaft after the yielding action of said spring is terminated.

6. An apparatus as set forth in claim 5, in which said inner frame has dimensions substantially corresponding to the size of the package unit to be produced, and said outer frame having dimensions somewhat larger than the size of said package unit.

7. An apparatus as set forth in claim 5, in which said electrode is at all times maintained energized, said electrode having nichrome wires secured thereto and having terminals for connection with a suitable electric source.

8. An apparatus as set forth in claim 5 in which said operating shaft has a linkage coupled thereto in an actuating cam engaged with said linkage for actuating said operating shaft.

9. An apparatus as set forth in claim 5, in which said work table assembly comprises two plate members disposed one upon another, the upper plate having said recess and a plurality of evacuation holes, the lower plate member including said evacuation pipe and a single evacuation hole for communicating with said pipe.

10. An apparatus as claimed in claim 5 in which the connection between said generating shaft and said flange is a rotatable adjustable connection, and a hand wheel coupled to said adjustable connection for adjusting it.

11. An apparatus for producing vacuum packages in succession, comprising an inner frame having a sealing electrode secured thereto and a centrally positioned shaft extending upwardly therefrom, an outer frame having an opening therein in which said shaft on the inner frame is movably mounted, a spring mounted between said shaft and said outer frame and urging said shaft through said outer frame to bring said inner frame against the under side of said outer frame, sealing means around said opening in said outer frame, operating means secured to said central shaft on said inner frame for driving said shaft and said frames up and down in the direction in which said shaft extends, a vertically movable work table assembly adapted to move vertically in synchronization with the movement of said outer frame and being adapted to position films of sealable packaging material containing the material to be packaged, said table assembly having an evacuation pipe thereon adapted to be connected to a vacuum producing means and opening into a space within said outer frame when said outer frame contacts said work table assembly, and valve means attached to said outer frame biased toward the closed position and enageable by said inner frame when said spring holds said inner frame against the under side of said outer frame.

References Cited by the Examiner
UNITED STATES PATENTS 2,633,684 4/1953 Rohdin _____ 53—112
3,196,590 7/1965 Ollier et al. _____ 53—112

TRAVIS S. McGEHEE, *Primary Examiner.*